(No Model.)

A. J. DANIELS.
Grocer's Forks.

No. 234,855.        Patented Nov. 30, 1880.

Witnesses.
S. N. Piper
W. W. Lunt

Inventor.
Arthur J. Daniels.
by attorney.
R. H. Eddy

United States Patent Office.

ARTHUR J. DANIELS, OF SOUTHBRIDGE, MASSACHUSETTS.

GROCER'S FORK.

SPECIFICATION forming part of Letters Patent No. 234,855, dated November 30, 1880.

Application filed October 20, 1880. (No model.)

*To all whom it may concern:*

Be it known that I, ARTHUR J. DANIELS, of Southbridge, in the county of Worcester and State of Massachusetts, have invented a new and useful Improvement in Grocers' Forks; and I do hereby declare the same to be described in the following specification and represented in the accompanying drawings, of which—

Figure 1:
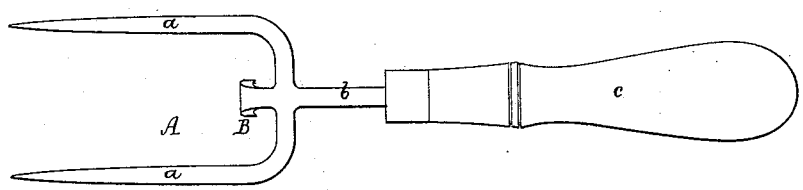
Figure 2:
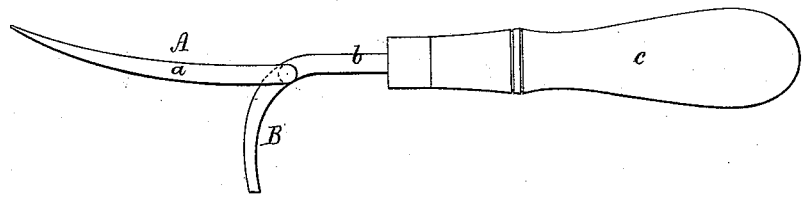

Figure 1 is a top view, and Fig. 2 a side elevation, of an implement containing or constituting my invention, which consists in a grocer's fork having a curved projection or bearing arranged with the prongs and shank in manner as described and represented.

The ordinary fork as used by grocers or others for loosening sugar, currants, or various other matters when compacted together is like a pitch or hay fork, except in having a short handle—that is, it has two prongs, a shank, and a handle, it being shown in the accompanying drawings, with the exception of the curved projection or bearing, which in my invention is combined with the fork and extended from the junction of the prongs and shank in manner as represented.

In such drawings, A denotes the fork, of which *a a* are the two prongs, *b* the shank, and *c* the handle, while B is the addition or curved projection or bearing, formed as shown. This curved projection greatly facilitates the operations of the fork, for after the prongs may have been forced into a closely-compacted mass of sugar or currants, the curved projection serves as a fulcrum for the fork while it may be in the act of prying up a part of the mass. The curved projection also answers to further loosen or separate the currants or matters on it being drawn through them, and besides it is useful for various other purposes, its addition to the fork rendering the implement not only capable of being used to better advantage, but for being employed for various purposes in a grocery or store to which it has not heretofore been applicable. The curved projection or bearing B is curved toward the handle, or has its concave side toward the handle, while its convex side is toward the prongs, such arrangement being productive of advantage relatively to a projection curved the opposite way—that is to say, with its convex side next the prongs, as shown in the pointed spur represented in the United States Patent No. 26,579. By curving the projection relatively to the prongs and shank in manner as shown in the accompanying drawings it is able to resist to much better advantage, the force tending to crowd it into a mass when the prongs are in such mass, and the fork is used as a lever to pry up or loosen a portion of the mass.

My improvement has no reference to a carving-fork, and it differs materially from that shown in the said patent, inasmuch as it has but one projection, and that is arranged differently relatively to the prongs, it being curved backward in respect to them, or has its convex side next them.

What, therefore, I claim as my invention is—

The grocer's fork A, provided with the arm or projection B, arranged with its prongs substantially as and for the purpose set forth—viz., as curved downward and backward toward the handle in manner to have the convex side of the projection next the prongs, as represented.

ARTHUR J. DANIELS.

Witnesses:
 R. H. EDDY,
 W. W. LUNT.